(12) United States Patent
Ngai

(10) Patent No.: US 7,174,411 B1
(45) Date of Patent: Feb. 6, 2007

(54) DYNAMIC ALLOCATION OF PCI EXPRESS LANES USING A DIFFERENTIAL MUX TO AN ADDITIONAL LANE TO A HOST

(75) Inventor: Henry P. Ngai, Coto De Caza, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 130 days.

(21) Appl. No.: 10/904,880

(22) Filed: Dec. 2, 2004

(51) Int. Cl.
*G06F 1/00* (2006.01)

(52) U.S. Cl. ............... 710/316; 710/317; 710/305; 710/307

(58) Field of Classification Search ........ 710/300–317, 710/62–64, 72, 8–19, 104–105
See application file for complete search history.

(56) References Cited

U.S. PATENT DOCUMENTS

| | | | | |
|---|---|---|---|---|
| 5,191,653 | A * | 3/1993 | Banks et al. | 710/113 |
| 6,134,621 | A * | 10/2000 | Kelley et al. | 710/311 |
| 6,215,412 | B1 | 4/2001 | Franaszek et al. | 340/825.02 |
| 6,760,327 | B1 | 7/2004 | Manchester et al. | 370/364 |
| 6,779,734 | B2 | 8/2004 | Hill | 235/492 |
| 6,788,682 | B1 | 9/2004 | Kimmitt | 370/389 |
| 6,792,003 | B1 | 9/2004 | Potluri et al. | 370/476 |
| 2002/0105966 | A1 | 8/2002 | Patel et al. | 370/463 |
| 2003/0120852 | A1 | 6/2003 | McConnell et al. | 710/316 |
| 2004/0088469 | A1 | 5/2004 | Levy | 710/316 |
| 2004/0179534 | A1 | 9/2004 | Pettey et al. | 370/395.5 |
| 2005/0088445 | A1* | 4/2005 | Gonzalez et al. | 345/502 |
| 2005/0102454 | A1* | 5/2005 | McAfee et al. | 710/107 |

* cited by examiner

*Primary Examiner*—Mark H. Rinehart
*Assistant Examiner*—Raymond N Phan
(74) *Attorney, Agent, or Firm*—gPatent LLC; Stuart T. Auvinen (57) ABSTRACT

Many Peripheral Component Interconnect Express (PCIE) lanes are available between a host and peripherals inserted into slots. Each PCIE lane is a bi-directional serial bus, with a transmit differential pair and a receive differential pair of data lines. The host has $2^N$ primary lanes plus one extra lane. The extra lane is allocated to a slot when another slot uses all $2^N$ primary lanes. The extra lane ensures that a low-priority peripheral has at least one lane when a high-priority peripheral requires all primary lanes. A partial cross-bar switching matrix between the host and peripheral slots switches lanes at the physical layer using transistor bus switches. A switch controller can be programmed by configuration software to enable transistor bus switches to allocate and connect host lanes to slot lanes. Peripherals can have 1, 2, 4, 8, 12, or 16 lanes allocated and may be inserted into any of the slots.

18 Claims, 10 Drawing Sheets

PRIOR ART

FIG. 3

PRIOR ART

DYNAMIC ALLOCATION OF PCI EXPRESS LANES USING A DIFFERENTIAL MUX TO AN ADDITIONAL LANE TO A HOST

FIELD OF THE INVENTION

This invention relates to serial buses, and more particularly to allocation of multiple serial buses in a system.

BACKGROUND OF THE INVENTION

Serial buses such as RS-232 have been widely used in systems such as the personal computer (PC). Standardized serial buses such as Peripheral Component Interconnect Express (PCIE) allow for interoperability of a wide variety of peripherals that can be inserted into bus expansion slots in a PC.

Serial buses that use differential data lines can have high data rates, as small voltage differences between the two data lines can be detected by receivers. Noise immunity is increased since noise that is coupled into both data lines does not affect the differential signal.

Figure 1:
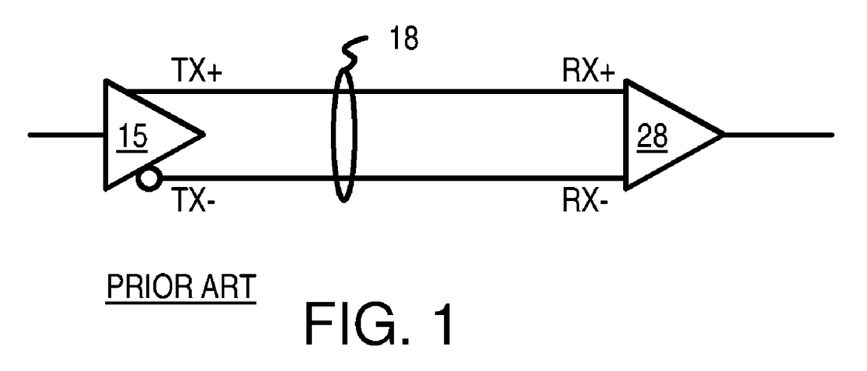
FIG. 1 shows a differential serial bus.

FIG. 1 shows a differential serial bus. Transmitter 15 receives a stream of data and drives a voltage difference onto wires TX+, TX− in host-transmit pair 18 to represent the data. Receiver 28 compares the voltage on TX+ to the voltage on TX− and generates an output signal to represent the data. The transmitter's output TX+ is the same line or wire as input RX+ for receiver 28, and output TX− is connected to input RX−. A cable containing host-transmit pair 18 may also have power and ground wires and one or more other pairs.

Figure 2:
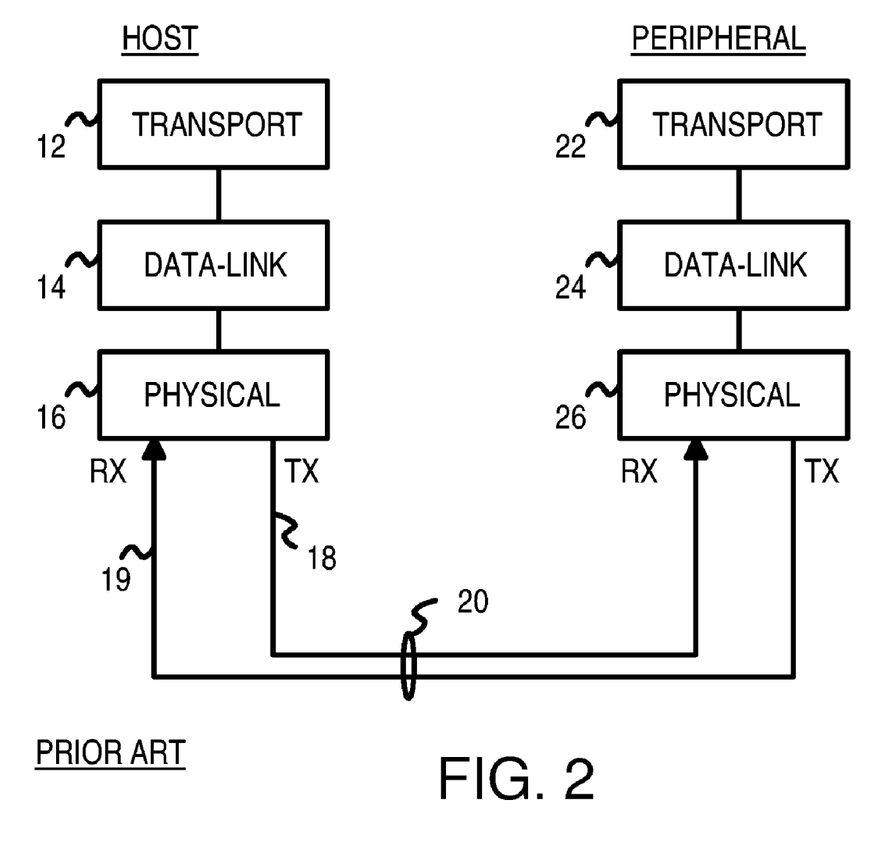
FIG. 2 shows a protocol-layer diagram of a system with a serial bus.

FIG. 2 shows a protocol-layer diagram of a system with a serial bus. Serial bus 20 has two differential pairs. Host-transmit pair 18 contains two data wires (TX+, TX−) that connect from the transmit Tx outputs of host physical layer 16 to the receive Rx inputs of peripheral physical layer 26. The host sends data to the peripheral over serial bus 20 using host-transmit pair 18. Host physical layer 16 generates differential signals on the two data wires of host-transmit pair 18 while peripheral physical layer 26 has a differential receiver. Host data is arranged in packets by host transport layer 12 and a link to the peripheral established by data link layer 14. Physical layers 16, 26 perform framing, indicating the beginning and end of a frame or packet. Data link layers 14, 24 add and check sequence numbers and checksums to ensure that a packet is received properly and without error.

For reply data from the peripheral to the host, host-receive pair 19 is used. Peripheral data is transmitted as differential data by peripheral physical layer 26 and received by a differential receiver in host physical layer 16.

PCIE is a point-to-point bus protocol, so each serial bus can have only two endpoints. Since each serial bus can carry only a limited bandwidth of data, PCIE allows for multiple serial buses to be placed in parallel between a host and a peripheral. Each serial bus between the host and a peripheral is known as a lane. A higher-bandwidth peripheral can be allocated more lanes than a slower peripheral.

Figure 3:
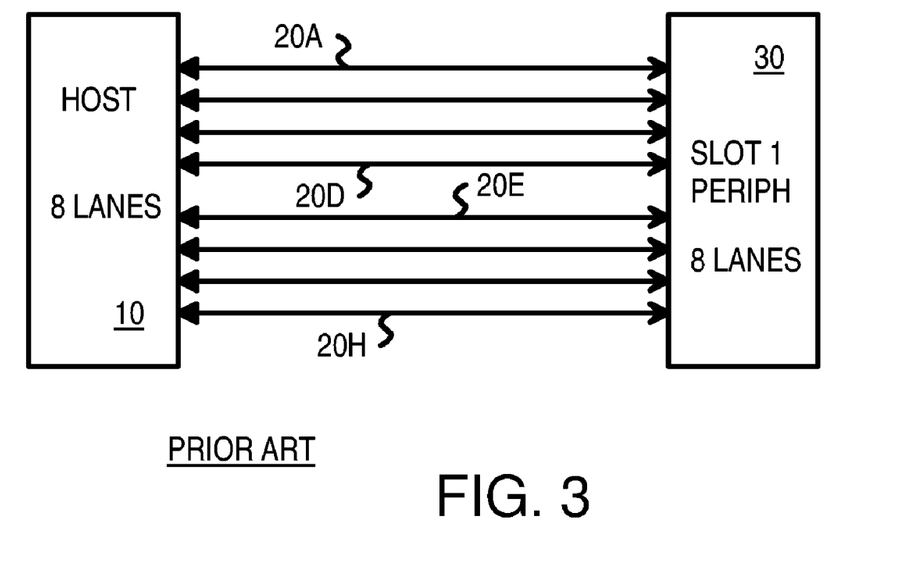
FIG. 3 shows a host connecting to a peripheral over 8 lanes.

FIG. 3 shows a host connecting to a peripheral over 8 lanes. Host 10 has 8 bi-directional serial buses, or lanes available. Lanes 20A–20H connect to peripheral 30, allowing the bandwidth to be increased by a factor of 8 relative to a single serial bus. Lanes 20A–20H can each be a serial bus with two differential pairs that follow the PCIE specification. Peripheral 30 can be a removable card or device plugged into an expansion slot or connector, or could be fixed in place.

Figure 4:
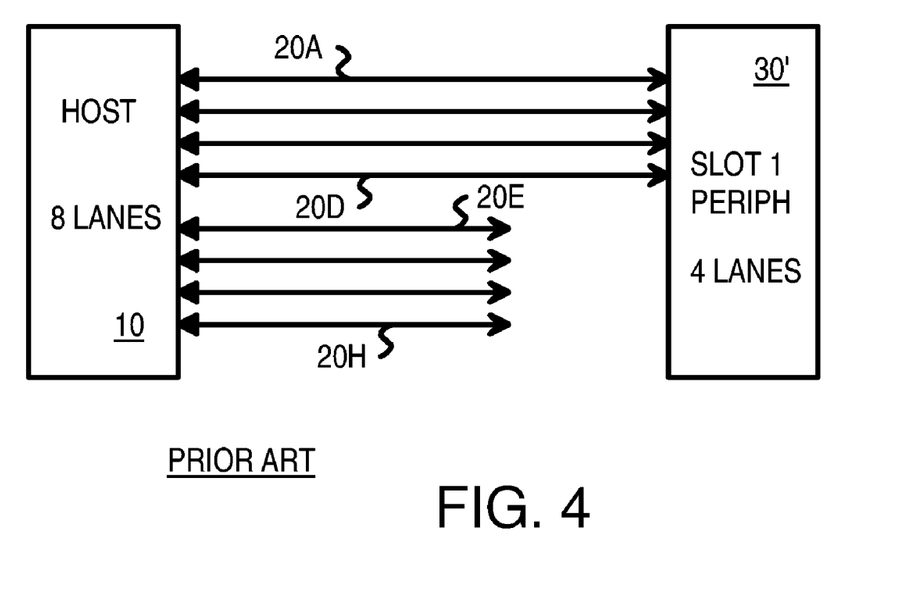
FIG. 4 shows a peripheral that uses only half its available lanes.

FIG. 4 shows a peripheral that uses only half its available lanes. Peripheral 30' is plugged into slot 1, which has connections for 8 lanes from host 10. However, peripheral 30' only supports 4 lanes, since it has only 4 serial-bus connections. The first four lanes 20A–20D from host 10 connect to peripheral 30' in slot 1, but the other 4 lanes 20E–20H from host 10 to slot 1 are not used, since peripheral 30' only has 4 serial-bus transceivers. During initialization, negotiation occurs between host 10 and peripheral 30' to determine the maximum number of lanes between the two device endpoints, which is the smaller number of lanes supported by either host 10 or peripheral 30'.

In a traditional parallel bus, signals could connect to other slots and be used by other peripherals. However, the timing requirements of high-speed serial buses such as PCIE require that each bus have only 2 endpoints. Thus each serial bus lane can connect from the host to only one slot. When the peripheral inserted into the slot does not use all serial-bus lanes, then the remaining unused lanes cannot be used by other peripherals in other slots. Thus the four lanes 20E–20H are wasted.

Although serial-bus lanes can have only two endpoints, one of the endpoints could be a bus switch. The bus switch can receive signals from the serial bus lane and re-transmit the signals over a second serial-bus segment. Such bus switches could allow lanes from a host to connect to different slots, based on the needs of the peripherals in those slots.

A software-based bus switch that connects serial buses together may be constructed by using switching software at or above the transport layer (See FIG. 2). The switching software can forward data from one physical layer to another physical layer. However, transport-layer switches can be slow since data must be passed up through the physical, data-link, and transport layers, and then back down from the transport layer to the data-line and physical layers.

A physical-layer bus switch may provide for faster data transmission with a reduced switch latency.

While such a bus switch is useful, some possible combinations of peripherals can have less than optimal lane allocations. For example, when one peripheral is a 16-lane peripheral, no lanes might remain for another peripheral in slot 2. When the second peripheral is a slow peripheral, it might be desirable to allocate just one lane to this peripheral, with the remaining lanes allocated to the first peripheral. However, the first peripheral may not be able so support an odd number of lanes, since the number of lanes for a peripheral are defined to be 1, 2, 4, 8, 12, 16, or 32. Thus the first peripheral could not support 15 lanes, and would have to drop back to using only 12 lanes, with the remaining 3 lanes being unused.

DETAIELD DESCRIPTION

The present invention relates to an improvement in serial-bus allocation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 5:
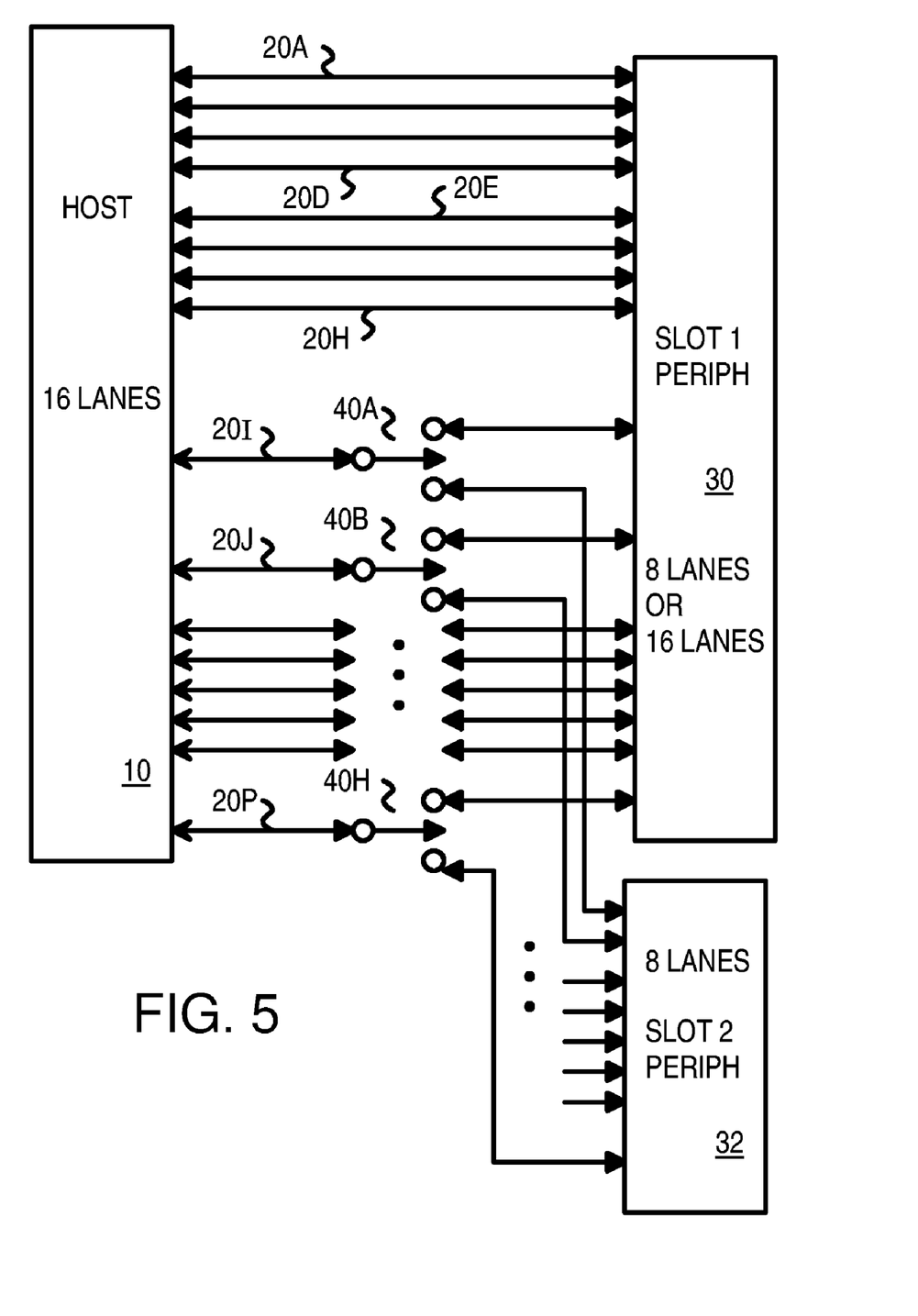
FIG. 5 shows a bus switch between a host and peripheral slots for allocating lanes.

FIG. 5 shows a bus switch between a host and peripheral slots for allocating lanes. A physical-layer bus switch may provide for faster data transmission with a reduced switch latency. Host 10 has a total of 16 available. Each of lane 20A–20P has two differential data pairs. Peripheral 30 in slot 1 can have either 8 or 16 lanes, depending on the type of peripheral inserted into the slot. Negotiation and configuration when peripheral 30 is inserted into slot 1, or at system boot-up, can be performed to determine the number of lanes to use.

The first 8 lanes 20A–20H are hardwired to slot 1. These lanes can only connect to peripheral 30. Should peripheral 30 need fewer lanes, such as 4 or 2 or just 1, the remaining 4, 6, or 7 lanes in lanes 20A–20H are unused.

The other 8 lanes 20I–20P from host 10 connect to switches 40A–40H, respectively. Each lane connects to just one switch. Each switch connects to two serial-bus segments to two peripheral slots. Thus the 8 lanes 20I–20P can connect host 10 to peripheral 30 slot 1, or to peripheral 32 in slot 2.

For example, lane 20I has a segment from host 10 to switch 40A. Switch 40A can connect this lane from host 10 to either a segment to peripheral 30 in slot 1, or to a different serial-bus segment to peripheral 32 in slot 2. This 9th lane from host 10 can be switched by switch 40A to be the 9th lane input to peripheral 30 in slot 1, or switched to be the first lane input to peripheral 32 in slot 2.

Switches 40A–40H can all be switched together, so that peripheral 30 in slot 1 has 16 lanes and peripheral 32 in slot 2 has no lanes, or so that peripheral 30 in slot 1 has 8 lanes and peripheral 32 in slot 2 has 8 lanes.

The inventor has discovered that adding an extra serial-bus lane to the host can allow for much more efficient allocations of serial-bus lanes to peripheral slots. The additional host lane gives the host an odd number of lanes, such as 9, 17, 33, 65, etc.

The inventor has further discovered that a physical-layer bus switch device can include an extra switch to mux in this extra lane to the peripheral slots. The extra switch can be in a backwards orientation relative to the other bus switches.

Figure 6:
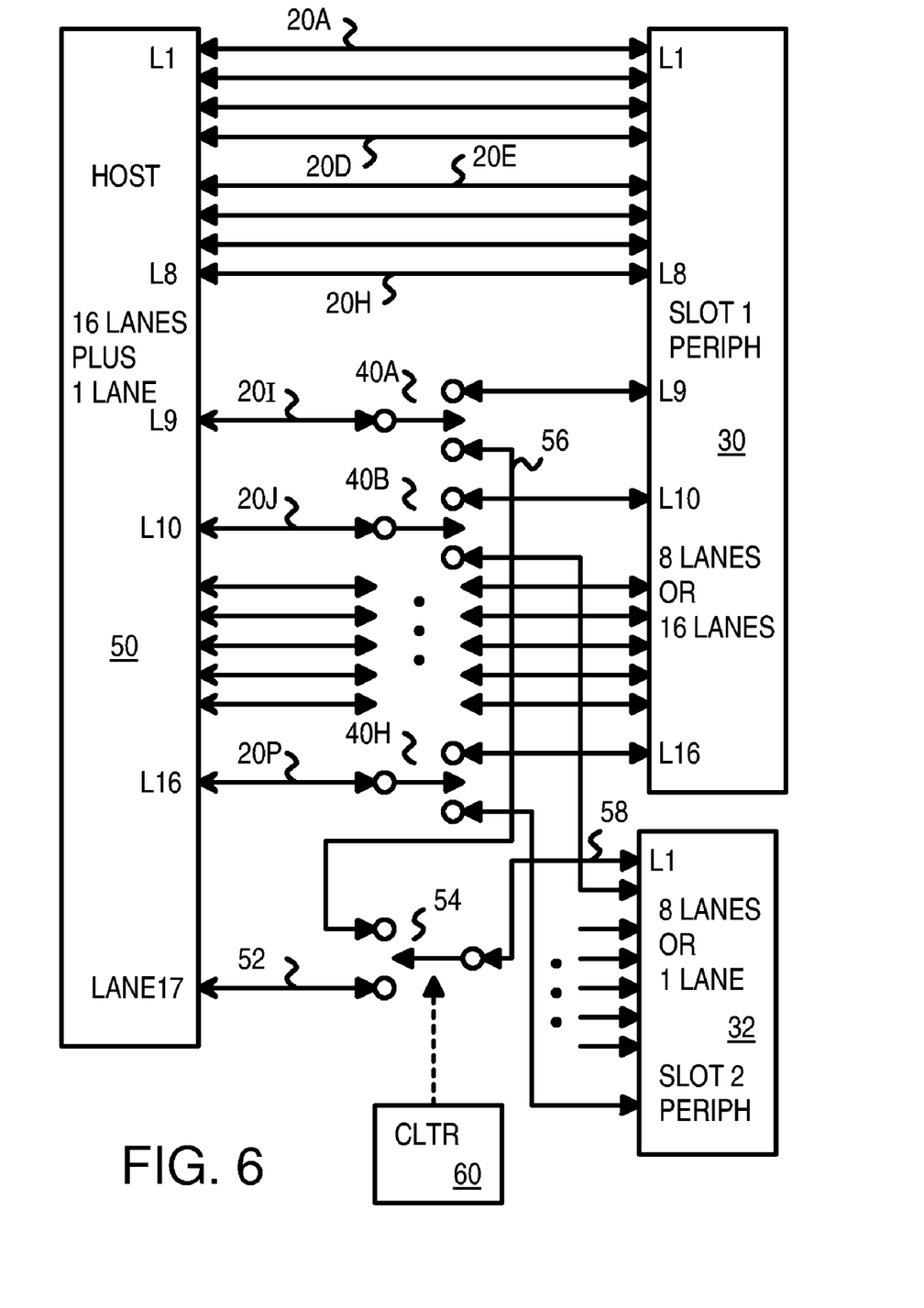
FIG. 6 is a diagram of lane allocation switching hardware when the host and bus switch have an extra lane.

FIG. 6 is a diagram of lane allocation switching hardware when the host and bus switch have an extra lane. Host 50 can be a personal computer with a bus controller that supports 17 serial bus I/O's. Each of the 17 serial-bus I/O contains a differential driver that drives a first (host-transmit) pair of wires, and a differential receiver that senses a voltage difference (or a switched current) on a second differential pair (host-receive pair). These 17 serial-bus I/O correspond to lanes L1, L2, L3 . . . L17.

Slot 1 can accept a peripheral card that supports 1, 2, 4, 8, or 16 lanes, while slot 2 can accept a peripheral card that supports 1, 2, 4, or 8 lanes in this example embodiment. The first 8 lanes, I/O L1–L8 from host 50 on lanes 20A–20H, connect directly to slot 1 as lanes L1–L8. Peripheral 30 inserted into slot 1 can be a 1, 2, 4, 8, or 16-lane device, using first lane 20A if its is configured as a 1-lane device, using lanes 20A, 20B if it is configured as a 2-lane device, using lanes 20A–20D if it is configured as a 4-lane device, and using all 8 lanes 20A–20H if it is configured as an 8-lane device.

When peripheral 30 is a 16-lane device configured to use all 16 lanes, then it receives its first 8 lanes L1–L8 directly from host 50 over lanes 20A–20H. The other 8 lanes L9–L16 are received from serial-bus segments that connect to switches 40A–40H. When switches 40A–40H are configured in the UP setting by switch controller 60, they connect serial-bus lanes 20I–20P from host 50 to the serial-bus segments to peripheral 30 in slot 1.

The second slot 2 can accept a peripheral card that supports 1, 2, 4, or 8 lanes, in this example embodiment. When peripheral 32 is an 8-lane device configured to use all 8 lanes, then it receives its 8 lanes L1–L8 from serial-bus segments that connect to switches 40A–40H and switch 54. When switches 40A–40H are configured in the DOWN setting and switch 54 is configured in the UP setting by switch controller 60, they connect serial-bus lanes 20I–20P from host 50 to the serial-bus segments to I/O L1–L8 of peripheral 32 in slot 2.

The first lane L1 input to peripheral 32 in slot 2 connects through 2 switches. Lane 9 (L9) from host 50 connects to 9th lane 20I, which has a far endpoint at switch 40A. Switch 40A in the DOWN setting connects to serial-bus segment 56 to switch 54. Switch 54 in the UP setting connects segment 56 to segment 58, which connects to the L1 input of slot 2. The other 7 lanes each connect to slot 2 through just one of switches 40B–40H, which are in the up position.

Switch 54 allows the extra lane 17 from host 50 to be used in some configurations. Switch 54 connects to first-lane I/O L1 of peripheral 32 in slot 2 over segment 58. Switch 54 selects lane 17 from host 50 when placed in the DOWN setting by switch controller 60. This is especially useful to allow peripheral 32 to receive at least one lane, the extra lane 17, when peripheral 30 in slot 1 requires all 16 lanes L1–L16 from host 50. Switches 40A–40H are in the UP setting, so peripheral 32 receives none of these first 16 lanes from host 50 in that configuration.

Connecting the additional lane 17 to peripheral 32 through switch 54 allows peripheral 32 to operate, even though it has only one lane, while allowing peripheral 30 in slot 1 to have the maximum number of lanes (16). Peripheral 30 may be a high-bandwidth peripheral such as a video controller, while peripheral 32 may be of lesser importance, such as a modem or print controller. Switch 54 and extra lane 17 allow peripheral 32 to have some bandwidth to host 50, while not limiting the bandwidth of high-priority peripheral 30.

Figure 7A:
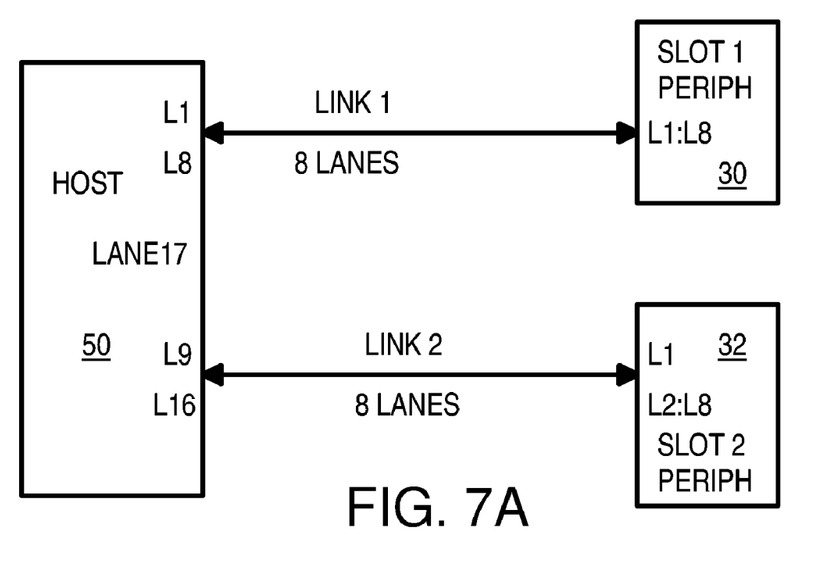
FIG. 7A is a diagram showing two 8-lane logical links.

FIG. 7A is a diagram showing two 8-lane logical links. Host 50 creates a first logical link to peripheral 30 in slot 1 using its first 8 lanes L1–L8. Host 50 also creates a second logical link to peripheral 32 in slot 2 using its second 8 lanes L9–L16. Lane 17 is not used. Peripherals 30, 32 are each configured as 8-lane devices.

Peripheral 30 could be a 16-lane device that is configured as an 8-lane device when the switch controller or configuration software determines that peripheral 32 is a high-priority device that warrants 8 lanes even if peripheral 30 is limited to 8 lanes.

Figure 7B:
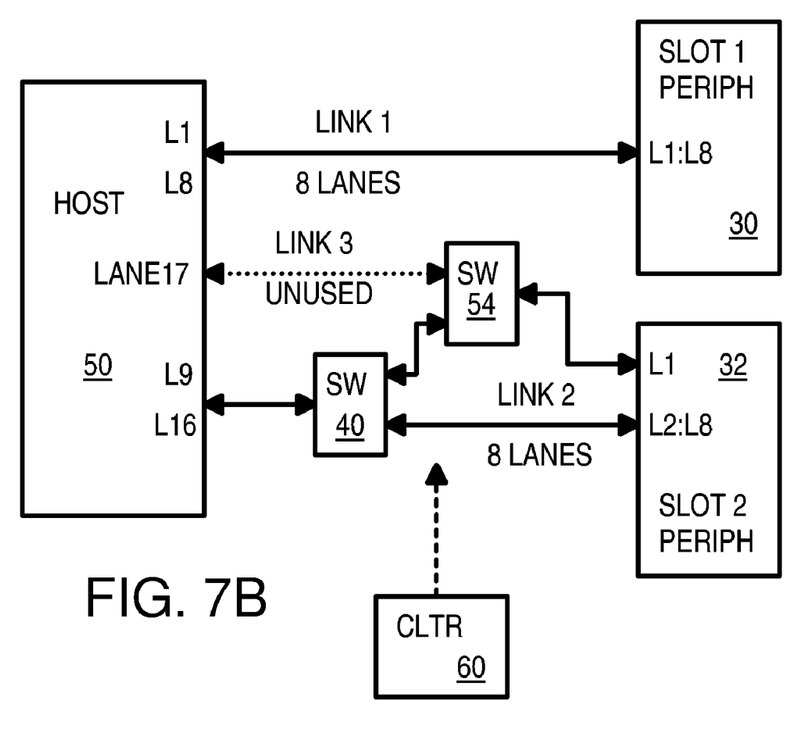
FIG. 7B is a diagram showing switch settings to produce the two 8-lane logical links of FIG. 7A.

FIG. 7B is a diagram showing switch settings to produce the two 8-lane logical links of FIG. 7A. The first link to peripheral 30 is formed by the direct connection of the first 8 lanes from host 50.

The second link to peripheral 32 is formed by the second 8 lanes from host 50, L9–L16, which connect to switches 40 (switches 40A–40H of FIG. 6). The last 7 of switches 40 connect to 7 serial-bus segments to I/O L2–L8 of peripheral 32 in slot 2. However, the first switch in switches 40 connects lane 9 from host 50 to switch 54, which then connects to the L1 I/O of peripheral 32. Thus a total of 8 lanes are connected between host 50 and peripheral 32. Switch controller 60 sets switches 40 and switch 54 in the correct arrangement to form these physical connections.

A possible third link, from lane 17 of host 50, is not used. The physical serial-bus segment from lane 17 of host 50 connects to switch 54, but is not passed through to peripheral 32. Instead, peripheral 32 receives its lane-1 I/O from lane 8 of host 50, through switches 40 and switch 54.

Figure 8A:
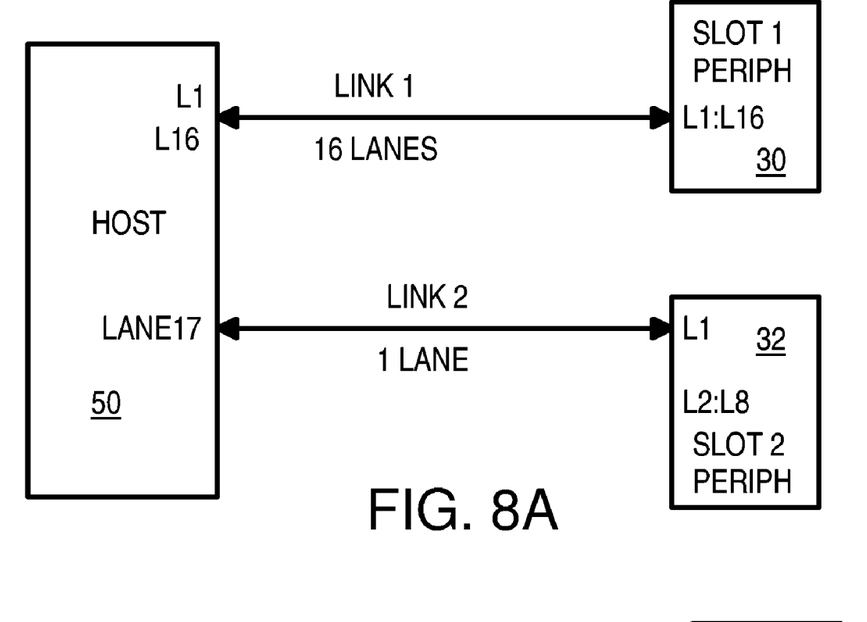
FIG. 8A is a diagram showing a 16-lane logical link and an extra 1-lane link.

FIG. 8A is a diagram showing a 16-lane logical link and an extra 1-lane link. Host 50 creates a first logical link to peripheral 30 in slot 1 using its first 8 lanes L1–L8 and its second 8 lanes L9–L16. Peripheral 30 is configured as 16-lane device.

Lane 17 is used to form a second logic link to peripheral 32 in slot 2. Peripheral 32 could be an 8-lane device that is configured as a 1-lane device when the switch controller or configuration software determines that peripheral 32 is a lower-priority device than peripheral 30, which warrants a full 16 lanes. Peripheral 32 could also be a 1, 2, or 4 lane device.

Figure 8B:
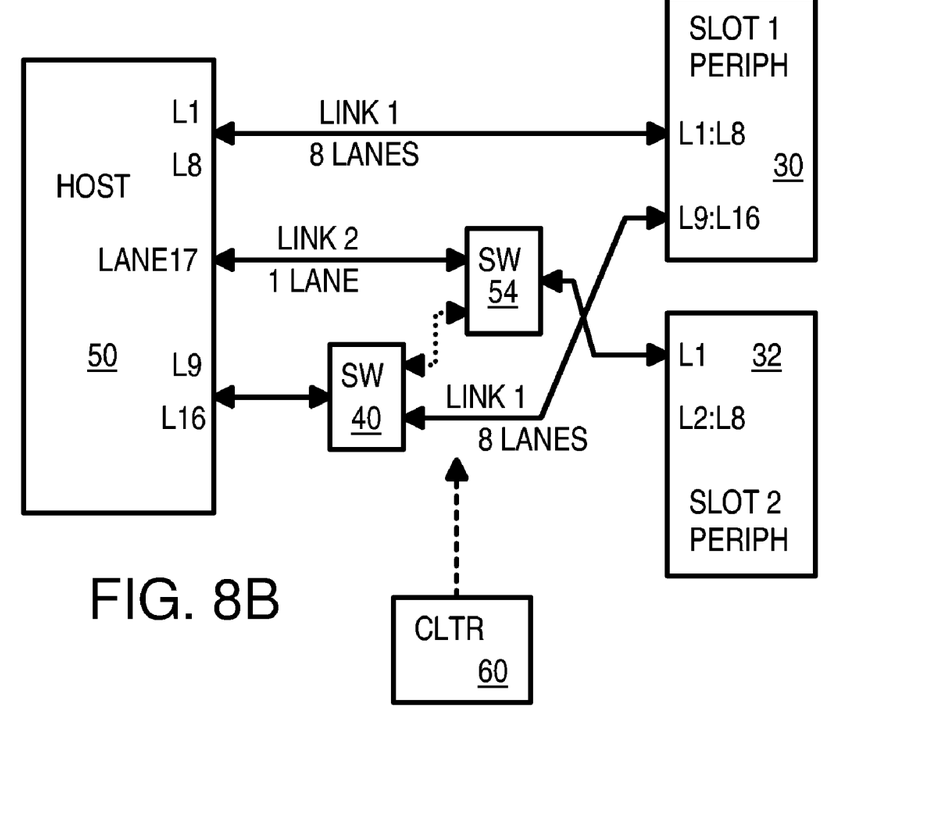
FIG. 8B is a diagram showing switch settings to produce the 16-lane logical link and the extra 1-lane link of FIG. 8A.

FIG. 8B is a diagram showing switch settings to produce the 16-lane logical link and the extra 1-lane link of FIG. 8A. The first link to peripheral 30 is formed by the direct connection of the first 8 lanes from host 50, and by the second 8 lanes from host 50, L9–L16, which connect to switches 40 (switches 40A–40H of FIG. 6) and then to peripheral 30. Switch controller 60 configures switches 40 to connect the 8 segments from host 50 to peripheral 30.

The second link to peripheral 32 is formed through switch 54. Extra lane 17 from host 50 connects to switch 54, which drives the lane-1 I/O of peripheral 32. Switch controller 60 configures switch 54 to select the serial-bus segment from lane 17 of host 50, rather than the segment to switches 40.

Figure 9A:
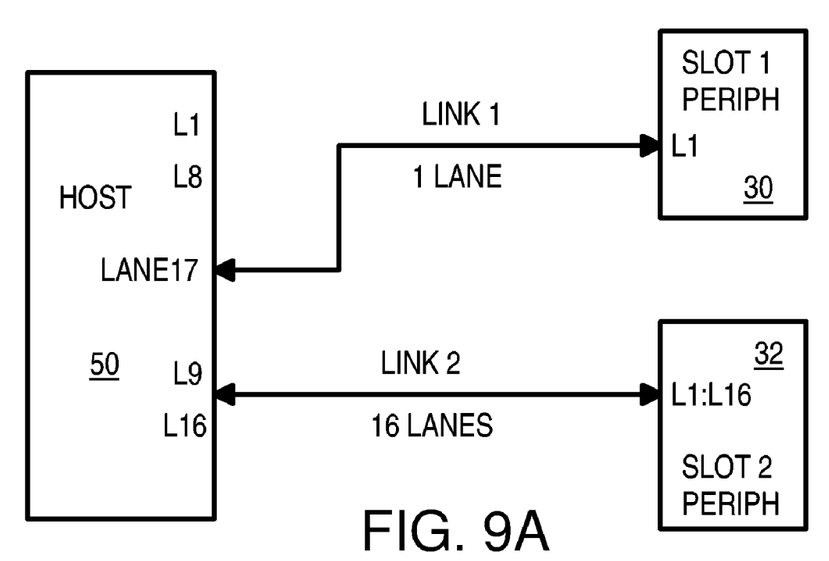
FIG. 9A is a diagram showing a 16-lane logical link to the second slot and an extra 1-lane link to the first slot.

FIG. 9A is a diagram showing a 16-lane logical link to the second slot and an extra 1-lane link to the first slot. To allow for any peripheral card to be inserted into any slot, it is desirable to allow for the configuration in which the high-priority 16-lane peripheral is inserted into slot 2 rather than slot 1. Then the extra lane is connected to slot 1 rather than to slot 2. Some additional switch hardware is needed to support this configuration.

Host 50 creates a first logical link to peripheral 30 in slot 1 using extra lane 17. Peripheral 30 could be a 16-lane or 8-lane device that is configured as a 1-lane device when the switch controller or configuration software determines that peripheral 32 is a higher-priority device than peripheral 30, warranting a full 16 lanes. Peripheral 30 could also be a 1, 2, or 4 lane device configured for 1 lane.

Lanes 1–16 are used to form a second logic link to peripheral 32 in slot 2. The first 8 lanes L1–L8 and the second 8 lanes L9–L16 from host 50 are used. Peripheral 30 is configured as a 16-lane device.

Figure 9B:
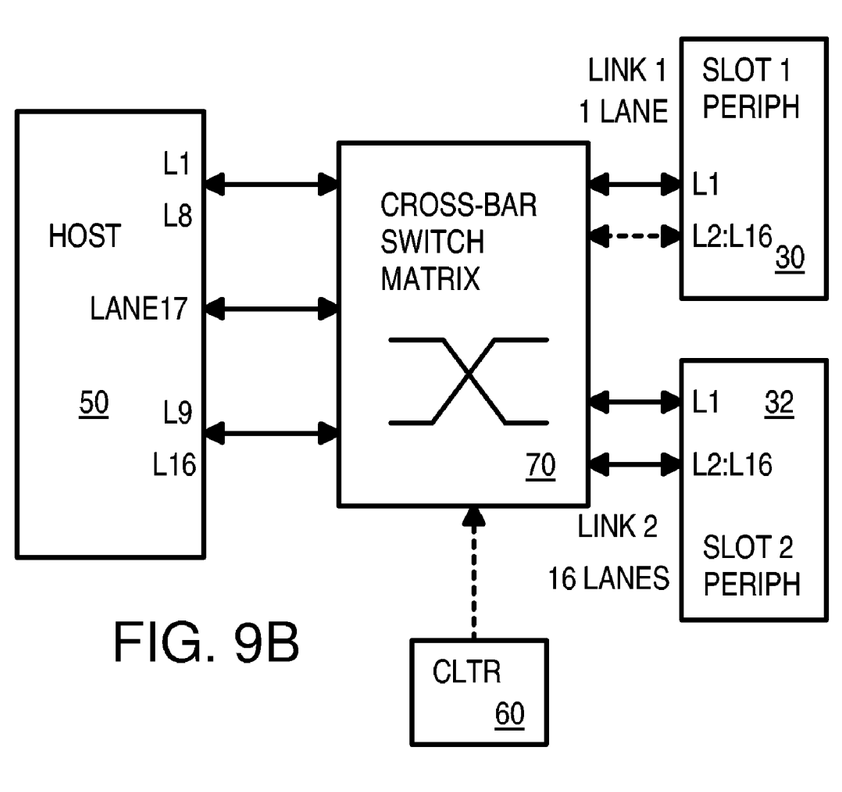
FIG. 9B is a diagram showing switch settings to produce the 1-lane and 16-lane logical links of FIG. 9A using a partial cross-bar switching matrix.

FIG. 9B is a diagram showing switch settings to produce the 1-lane and 16-lane logical links of FIG. 9A. Partial cross-bar switching matrix 70 is a physical-layer switch that contains transistors to connect various inputs and outputs. For example, lane 1 from host 50 can be connected to lane 1 of slot 1, or to lane 1 of slot 2. Lane 17 can be connected to lane 1 of slot 1, or to lane 1 of slot 2. Lanes 2–8 from host 50 can be connected to lanes 2–8 of slot 1, or to lanes 2–8 of slot 2. Lanes 9–16 from host 50 can be connected to lanes 9–16 of slot 1, or to lanes 9–16 of slot 2. Each bi-directional, differential lane has two pairs of differential lines, or 4 wires. Power and ground lines for different lanes could be tied to power and ground buses.

The first link is formed from lane 17 of host 50, through partial cross-bar switching matrix 70, to lane 1 of peripheral 30 in slot 1. The second link has 16 lanes, which are lanes L1–L16 from host 50, which connect to lanes 1–16 of peripheral 32 in slot 2 through partial cross-bar switching matrix 70. Cross-bar switching matrix 70 is controlled by switch controller 60, which can generate configuration signals or codes to indicate how to connect serial-bus I/O's on cross-bar switching matrix 70.

Figure 10A:
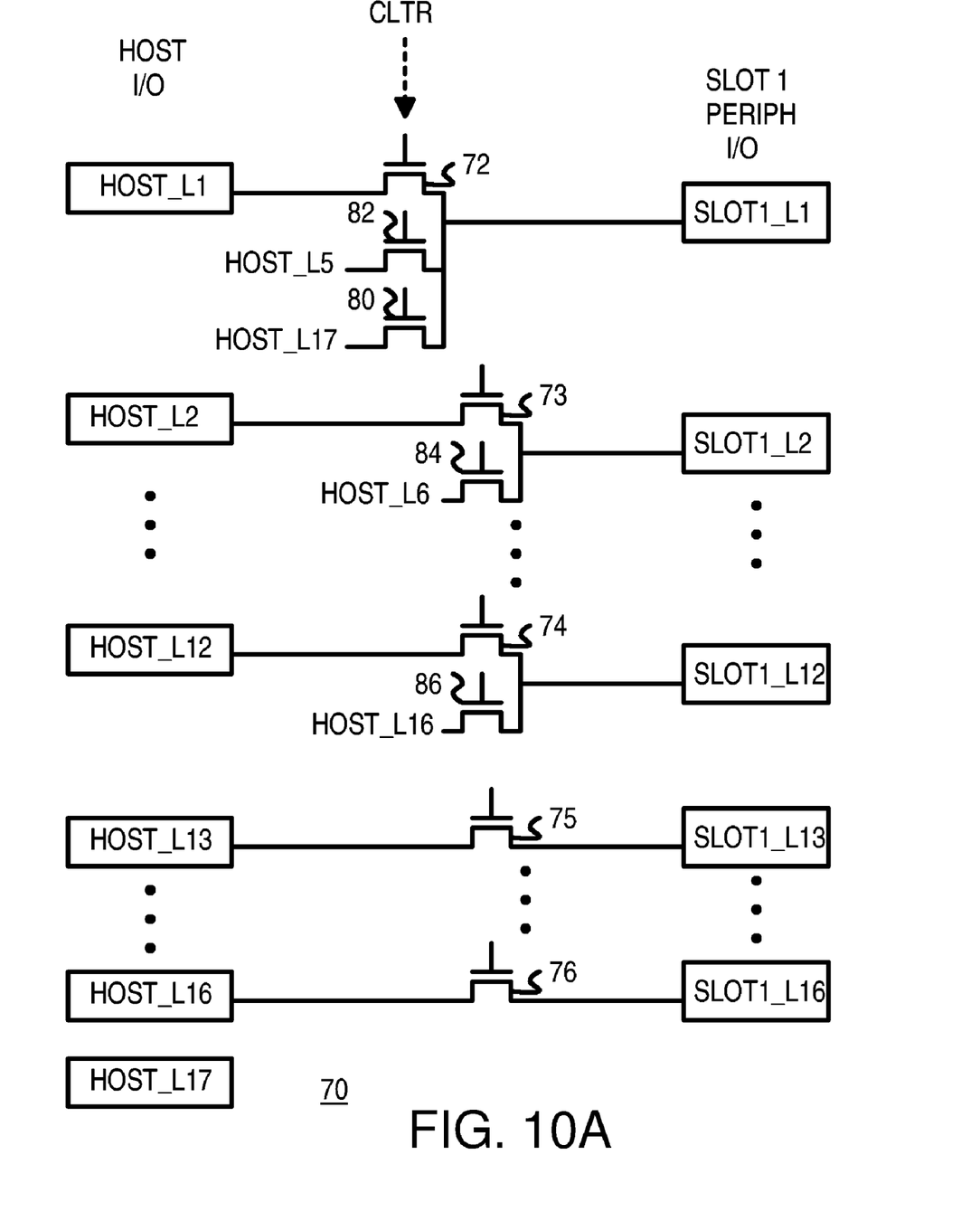
FIGS. 10A–C are diagrams of a partial cross-bar switching matrix.
Figure 10B:
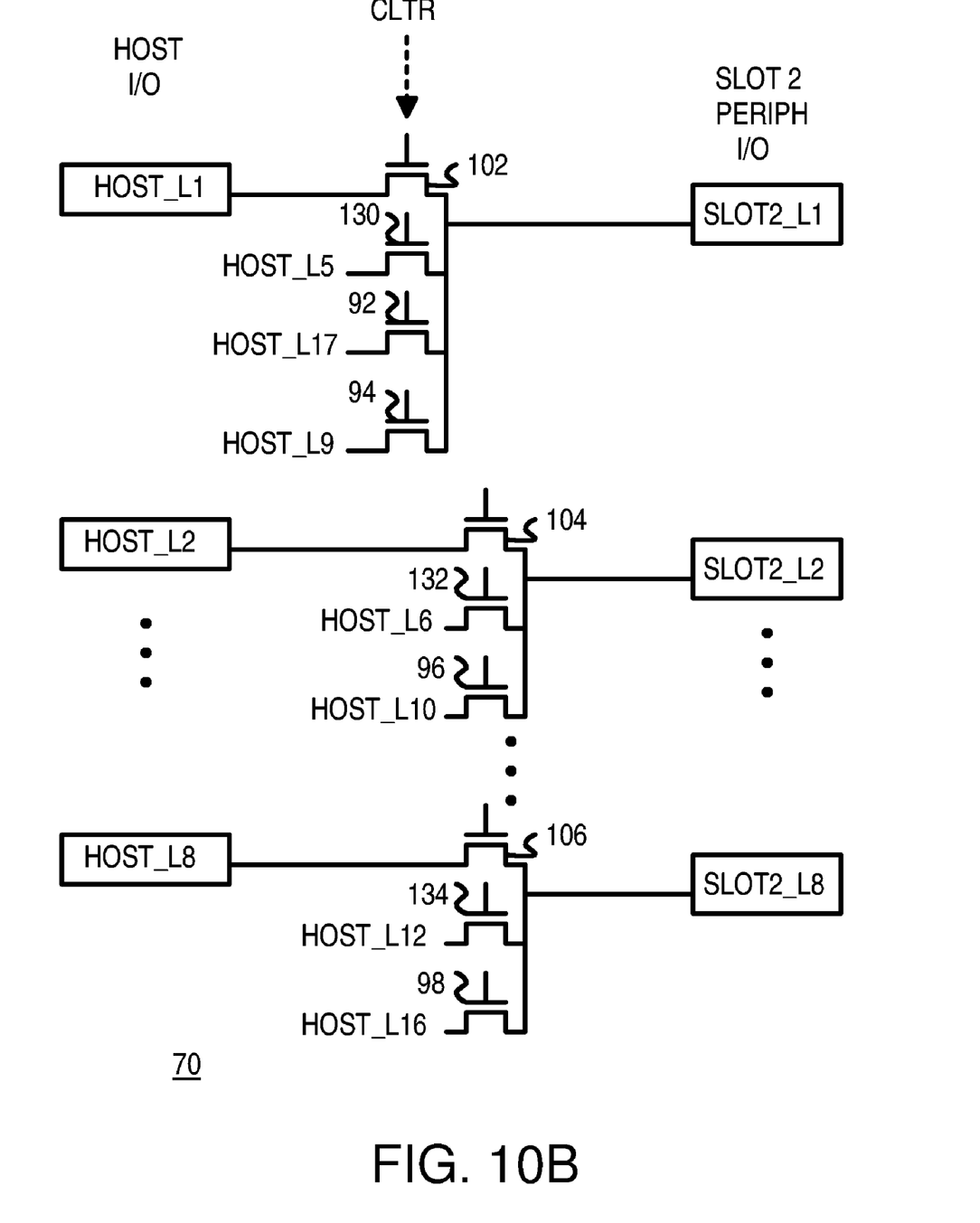
Figure 10C:
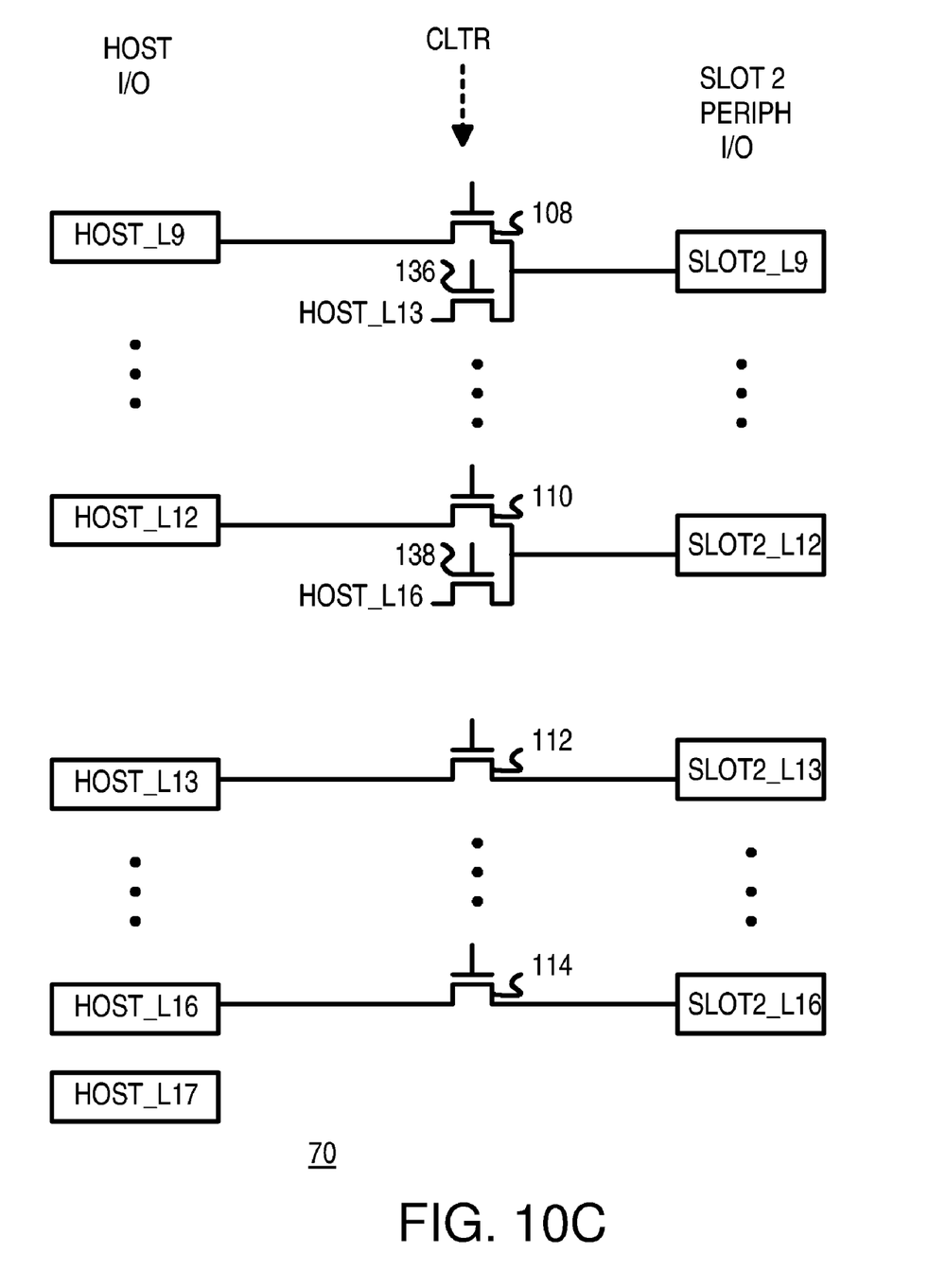

FIGS. 10A–C are diagrams of a partial cross-bar switching matrix. Partial cross-bar switching matrix 70 has host I/O's for lanes 1–17 from the host, and peripheral I/O's for slot 1 and for slot 2 for lanes 1–16. Since transistors within cross-bar switching matrix 70 are relatively close to one another, they act as one endpoint to an external serial-bus segment, even when the I/O connects to two or more switch transistors within partial cross-bar switching matrix 70.

Since each lane has 4 wires, each transistor and I/O pad in FIGS. 10A–C is repeated four times, one for each wire. For example, transistor 72 is replicated to four transistors. One transistor 72 connects host-1 lane 1 TX+ to slot-1 lane 1 RX+, another transistor 72 connects host-1 lane 1 TX– to slot-1 lane 1 RX–, a third transistor 72 connects host-1 lane 1 RX+ to slot-1 lane 1 TX+, and a fourth transistor 72 connects host-1 lane 1 RX– to slot-1 lane 1 TX–.

A variety of possible configurations may be supported by partial cross-bar switching matrix 70 in this example embodiment. Each slot can have 1, 2, 4, 8, 12, or 16 lanes. Possible configurations of host lanes L1–L16 to 16-lane slots 1, 2 with the extra lane 17 (L17) available from the host are:

| Configuration | Slot 1 Lanes | Slot 2 Lanes |
| --- | --- | --- |
| 16:1 | L1–L16 | L17 |
| 12:4 | L5–L16 | L1–L4 |
| 12:2 | L5–L16 | L1–L2 |
| 8:8 | L1–L8 | L9–L16 |
| 4:12 | L1–L4 | L5–L16 |
| 2:12 | L1–L2 | L5–L16 |
| 1:16 | L17 | L1–L16 |

In FIG. 10A, slot 1, lane 1 can connect to host lanes 1, 5, or 17, by driving a high signal to the gates of transistors 72, 82, 80, respectively. Only one of transistors 72, 80, 82 is turned on for any one configuration. For example, for any of configuration s 16:1, 8:8, 4:12, and 2:12 in the table above, transistor 72 turns on and transistors 80, 82 are off to connect host lane 1 to slot-1 lane 1. For configuration 1:16 in the table above, transistor 80 turns on and transistors 72, 82 are off to connect host lane 17 to slot-1 lane 1. For configurations 12:4, and 12:2 in the table above, transistor 82 turns on and transistors 72, 80 are off to connect host lane 5 to slot-1 lane 1.

For slot 1, lane 2 (SLOT1_L2), transistor 73 connects it to host L2 for configurations 16:1, 8:8, 4:12, and 2:12, while transistor 84 connects it to host lane 6, which is needed for configurations 12:4 and 12:2. Lanes 3–12 are similar to lane 2, each having two transistors. For example, lane 3 has one transistor to connect to host lane 3, and another transistor to connect to host lane 7. Lane 12 to slot 1 has transistor 74 to connect to host lane 12 in configurations 16:1, 8:8, 4:12, and 2:12, while transistor 86 connects slot-1 lane 12 to host lane 16, which is needed for configurations 12:4 and 12:2. For the 8:8 configuration, the first 8 transistors 72, 73 . . . are on for lanes 1–8, but the second 8 transistors . . . 74, 75 . . . 76 are off for lanes 9–16.

Lanes 13 to 16 have only one transistor. Transistor 75 connects slot-1 lane 13 to host lane 13, and transistor 76 connects slot-1 lane 16 to host lane 16 for configuration 16:1, 12:4, and 12:2.

FIGS. 10B–C show transistors that connect host lanes to slot-2 lanes. In FIG. 10B, slot-2 lane 1 can connect to host lanes 1, 5, 9, or 17 through transistors 102, 130, 94, 92 respectively. Slot-2 lane 2 can connect to host lanes 2, 6, or 10 through transistors 104, 132, 96 respectively. Slot-2 lane 8 can connect to host lanes 8, 12, or 16 through transistors 106, 134, 98 respectively.

In FIG. 10C, slot-2 lane 9 can connect to host lanes 9 or 13 through transistors 108, 136 respectively. Slot-2 lane 12 can connect to host lanes 12 or 16 through transistors 110, 138 respectively. Slot-2 lanes 13–16 can connect to host lanes 13–16 through transistors 112, . . . 114, respectively.

For configuration 16:1, slot 1 lanes 1–16 connect to host lanes 1–16 by turning on transistors 72, 73, . . . 74, 75, . . . 76. Slot 2 lane 1 connects to host lane 17 by transistor 92 turning on. Other transistors are off.

For configuration 12:4, slot-1 lanes 1–1 2 connect to host lanes L5–L16 through transistors 82, 84, . . . 86. Slot 2 lanes 1–4 connect to host lanes L1–L4 through transistors 102, 104, . . . on the first four lanes. Other transistors are off. Configuration 12:2 is similar, except that only the first two lanes of slot 2 are connected, so only transistors 102, 104 are turned on for slot-2.

For configuration 8:8, slot 1 lanes 1–8 connect to host lanes 1–8 by turning on transistors 72, 73, . . . for the first 8 lanes only. Slot-2 lanes 1–8 connect to host lanes 9–16 through transistors 94, 96, . . . 98. Other transistors are off.

For configuration 4:12, slot-2 lanes 1–12 connect to host lanes L5–L16 through transistors 130, 132 . . . 134, 136, . . . 138. Slot 1 lanes 1–4 connect to host lanes L1–L4 through transistors 72, 73, . . . on the first four lanes. Other transistors are off. Configuration 2:12 is similar, except that only the first two lanes of slot 1 are connected, so only transistors 72, 73 are turned on for slot-1. Transistors . . . 74, 75, . . . 76 are turned off for the last 8 lanes.

Not all lanes and all transistors are shown. For example, lanes 14, 15 are not shown. There are 2 transistors (not shown) for lanes 14, 15 between transistors 75, 76.

For configuration 1:16, slot 2 lanes 1–16 connect to host lanes 1–16 by turning on transistors 102, 104, . . . 106, 108, . . . 110, 112, . . . 114. Slot 1 lane 1 connects to host lane 17 by transistor 80 turning on. Other transistors are off.

Alternate Embodiments

Several other embodiments are contemplated by the inventor. For example slots may also support 32 lanes or more, or may support 16, 8, or 4 lanes per slot, or some other lane combinations. The bus switches can be integrated together on one or more integrated circuit devices, or could be integrated together with a PCIE switch chip or a PCIE root complex chip. Control signals for the bus switches may be shared or separate. Special bus-switch devices that provide extra isolation in the event of undershoots or overshoots on the serial-bus lines may be used. See for example U.S. Pat. Nos. 6,034,553, 6,075,400, 6,052,019, 6,559,703, 6,320,408 and others assigned to the present assignee, Pericom Semiconductor Corp. of San Jose, Calif.

Additional peripheral slots and additional lanes may be provided for by extensions of the simple examples disclosed herein. For example, the extra lane from the host could be muxed to three slots by addition of another bus switch in series on serial-bus segment 52 between the host and switch 54 (FIG. 6). The new switch could select between slots 1, 2, and slots 3,4 in a four-slot system. Otherwise the 2-slot scheme is doubled to 4 slots, and the host increased from 17 to 33 slots. Many other extensions are possible, such as having 2 additional lanes, one for every 2 slots. Slots are interfaces that can use edge or other connectors for removable peripheral cards or removable cable connectors to peripherals. Some slots may have permanently or semi-permanently installed peripherals. A switch controller can be programmed by configuration software or firmware to enable transistor bus switches in the partial cross-bar switching matrix to allocate and connect host lanes to slot lanes.

While some peripherals have been described as high-priority or low-priority, priority may not be determinate but rather be subjective. Different peripherals may have different bandwidth requirements. Sometimes all bandwidth requirements may be met, and priority does not matter. In other situations, the number of lanes may be limited and one peripheral may not receive its full bandwidth because another peripheral is deemed more important, or was randomly chosen to have a higher priority.

Rather than have the first 8 lanes directly hardwired to the first slot, these first 8 lanes could also connect to switches similar to those for lanes 9–16. These additional switches connect to both slot 1 and slot 2. The second slot could be expanded to a maximum capacity of 16 lanes. Then a variety of link configurations are possible, such as 16 lanes for slot 1, 1 lane for slot 2 (16,1), and other combinations such as (12,4), (8,8), (4,12), (2,12), and (12,2). When the 17th lane is also connected by switches to slot 1, then another configuration is 1 lane for slot 1, 16 lanes for slot 2 (1, 16).

Additional switches may be added to allow for some configurations, such as (12,4), where lane 13 is muxed to L1 of slot 2, lane 14 is muxed to L2 of slot 2, etc.

The partial cross-bar switching matrix of FIGS. 10A–C may be used to support more complex and flexible configurations, and may be extended to more than 2 slots, or to 32 lanes per slot. Additional transistors may be added for the additional connections. Rather than use n-channel transistor switches, p-channel transistor switches or transmission gate (p and n transistors in parallel) could be substituted. While the term cross-bar has been used, it is not necessarily a full cross-bar switch since not all possible cross-connections need to be implemented.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A re-configurable bus system comprising:
a host interface to a host;
a physical-layer switch;
primary lanes between the host interface and the physical-layer switch;
an extra lane between the host interface and the physical-layer switch;
wherein each of the primary lane and the extra lane is a bi-directional serial bus;
a first slot for receiving a first peripheral device;
a second slot for receiving a second peripheral device;
first lanes between the physical-layer switch and the first slot; and
second lanes between the physical-layer switch and the second slot;
wherein the physical-layer switch can be configured into a first maximum configuration wherein the primary lanes connect to the first lanes to the first slot, while the extra lane connects to the second slot;
wherein the physical-layer switch can be configured into a partitioned configuration wherein the primary lanes are partitioned among the first and second slot and the extra lane is not connected to either the first slot or to the second slot;
wherein the primary lanes comprise $2^N$ lanes, wherein N is a whole number of 2 or more;
wherein the extra lane comprises exactly one lane;
whereby a total number of lanes from the host is exactly $2^N+1$ lanes.

2. The re-configurable bus system of claim 1 wherein the first lanes, second lanes, primary lanes, and extra lane are each a Peripheral Component Interconnect Express (PCIE) serial bus having two differential pairs.

3. The re-configurable bus system of claim 2 wherein the physical-layer switch can be configured into a second maximum configuration wherein the primary lanes connect to the second lanes to the second slot, while the extra lane connects to the first slot;
wherein the second slot can connect to all $2^N$ primary lanes in the second maximum configuration.

4. The re-configurable bus system of claim 2 wherein each of the primary lane and the extra lane is a bi-directional serial bus having a transmit differential pair of data lines and a receive differential pair of data lines, wherein the host transmits data over the transmit differential pair and receives data over the receive differential pair.

5. The re-configurable bus system of claim 3 wherein when the physical-layer switch is in the first maximum configuration, the extra lane connects to a first lane position in the second slot; and
wherein when the physical-layer switch is in the second maximum configuration, the extra lane connects to a first lane position in the first slot,
whereby the extra lane is routed to the first lane position in the first or second slot for maximum configurations.

6. The re-configurable bus system of claim 5 wherein the first peripheral device may be inserted into the first slot or into the second slot,
whereby peripherals in slots are interchangeable to other slots.

7. The re-configurable bus system of claim 4 wherein the physical-layer switch comprises a plurality of bus-switch transistors that are selectively enabled to connect primary lanes and the extra lane to the first and second lanes in response to configuration signals.

8. The re-configurable bus system of claim 7 further comprising:
a switch controller, responsive to execution of a lane-allocation routine, for generating the configuration signals to the physical-layer switch.

9. A re-configurable bus system comprising:
a host interface to a host;
a physical-layer switch;
primary lanes between the host interface and the physical-layer switch;
an extra lane between the host interface and the physical-layer switch;
wherein each of the primary lane and the extra lane is a bi-directional serial bus;
a first slot for receiving a first peripheral device;
a second slot for receiving a second peripheral device;
first lanes between the physical-layer switch and the first slot; and
second lanes between the physical-layer switch and the second slot;
wherein the physical-layer switch can be configured into a first maximum configuration wherein the primary lanes connect to the first lanes to the first slot, while the extra lane connects to the second slot;
wherein the physical-layer switch can be configured into a partitioned configuration wherein the primary lanes are partitioned among the first and second slot and the extra lane is not connected to either the first slot or to the second slot;
wherein the physical-layer switch comprises a differential partial cross-bar switch with a plurality of switch connections, wherein each switch connection between a host lane that is one of the primary lanes and a slot lane that is one of the first lanes or one of the second lanes comprises:
a transmit-positive transistor between the host lane and the slot lane for carrying a transmit-positive data line from the host;
a transmit-negative transistor between the host lane and the slot lane for carrying a transmit-negative data line from the host;
a receive-positive transistor between the host lane and the slot lane for carrying a receive-positive data line from the host; and
a receive-negative transistor between the host lane and the slot lane for carrying a receive-negative data line from the host;
wherein the transmit-positive data line and the transmit-negative data line together carry a differential signal generated by the host;
wherein the receive-positive data line and the receive-negative data line together carry a differential signal received by the host.

10. The re-configurable bus system of claim 9 wherein the physical-layer switch comprises:
first straight-through switch connections that connect lane-positions of the primary lanes to corresponding lane-positions of the first lanes;
a first extra switch connection that connects the extra lane to a first lane-position of the first lanes for a second maximum configuration;
second straight-through switch connections that connect lane-positions of the primary lanes to corresponding lane-positions of the second lanes;
a second extra switch connection that connects the extra lane to the first lane-position of the second lanes for the first maximum configuration; and
second split switch connections that connect primary lanes having lane-positions 9 to 16 to second lanes having lane-positions 1 to 8 respectively.

11. The re-configurable bus system of claim 10 wherein the physical-layer switch can be configured into a split configuration wherein the primary lanes are partitioned equally among the first and second slot and the extra lane is not connected to either the first slot or to the second slot;
wherein some but not all of the first straight-through switch connections and the second split switch connections are activated for the split configuration.

12. The re-configurable bus system of claim 11 wherein the physical-layer switch can be configured into a shifted configuration wherein the primary lanes are partitioned non-equally among the first and second slot and the extra lane is not connected to either the first slot or to the second slot;
wherein the physical-layer switch further comprises:
first shifted switch connections that connect primary lanes having lane-positions 5 to 16 to first lanes having lane-positions 1 to 12 respectively; and
second shifted switch connections that connect primary lanes having lane-positions 5 to 16 to second lanes having lane-positions 1 to 12 respectively;
wherein the first shifted switch connections or the second shifted switch connections are activated for the shifted configuration.

13. A serial-bus allocator comprising:
a plurality of slots for accepting peripherals, including a first slot and a second slot;
a plurality of host lanes that are allocatable among the plurality of slots;
a switching matrix between the plurality of host lanes and the plurality of slots; and
a switch controller for controlling connections within the switching matrix;
wherein the plurality of host lanes comprises $2^N+1$ lanes or a multiple of $2^N+1$ lanes, wherein N is a whole number of 3 or more;
wherein each lane has a transmit differential pair of data lines and a receive differential pair of data lines;
wherein the first slot can accept a first peripheral that is configured for 1, 4, or 8 lanes;
wherein the second slot can accept a second peripheral that is configured for 1, 4, or 8 lanes;
wherein each lane is a Peripheral Component Interconnect Express (PCIE) bus having two differential pairs of data lines
wherein the switching matrix is configured by the switch controller for a split configuration by enabling transistors to connect a first $2^{N-1}$ of the plurality of host lanes to the first slot, and by enabling transistors to connect a second $2^{N-1}$ of the plurality of host lanes to the second slot, and disabling other transistors.

14. The serial-bus allocator of claim 13 wherein the switching matrix comprises transistors connecting serial-bus segments in the plurality of host lanes to serial-bus segments to the plurality of slots;
wherein the switching matrix is configured by the switch controller for a first maximum configuration by enabling transistors to connect $2^N$ of the plurality of host lanes to the first slot, and by enabling transistors to connect one of the plurality of host lanes to the second slot, and disabling other transistors.

15. The serial-bus allocator of claim 14 wherein the switching matrix is configured by the switch controller for a second maximum configuration by enabling transistors to connect $2^N$ of the plurality of host lanes to the second slot, and by enabling transistors to connect one of the plurality of host lanes to the first slot, and disabling other transistors.

16. The serial-bus allocator of claim 15 wherein the switching matrix is configured by the switch controller for a second maximum configuration by enabling transistors to connect $2^N$ of the plurality of host lanes to the second slot, and by enabling transistors to connect one of the plurality of host lanes to the first slot, and disabling other transistors.

17. The serial-bus allocator of claim 16 wherein the first slot can accept a first peripheral that is configured for 1, 4, 8, 12, or 16 lanes;
wherein the second slot can accept a second peripheral that is configured for 1, 4, 8, 12, or 16 lanes;
wherein the switching matrix is configurable for (X,Y) configurations, wherein X is a number of lanes allocated to the first slot, and wherein Y is a number of lanes allocated to the second slot, wherein configurations include (16,1), (12,4), (8,8), (4,12), and (1,16).

18. A lane-allocating system comprising:
host computer means for controlling bus transactions;
host lanes and an extra lane for carrying serial data to and from the host computer means, wherein the host lanes comprise $2^N$ lanes wherein N is a whole number of at least 3;
first slot means for connecting first lanes to a first peripheral;
second slot means for connecting second lanes to a second peripheral;
partial cross-bar switching means, coupled between the host lanes and the first lanes and the second lanes, for forming switch connections;

wherein each of the host lanes, each of the first lanes, and each of the second lanes comprises lane means for carrying differential data in two directions;

first straight-through switch means, in the partial cross-bar switching means, for forming switch connections that connect lane-positions of the host lanes to corresponding lane-positions of the first lanes for a first maximum configuration;

first extra switch connection means, in the partial cross-bar switching means, for forming switch connections that connect the extra lane to a first lane-position of the first lanes for a second maximum configuration;

second straight-through switch connection means, in the partial cross-bar switching means, for forming switch connections that connect lane-positions of the host lanes to corresponding lane-positions of the second lanes for the second maximum configuration;

second extra switch connection means, in the partial cross-bar switching means, for forming switch connections that connect the extra lane to the first lane-position of the second lanes for the first maximum configuration; and first split switch connection means, in the partial cross-bar switching means, for forming switch connections that connect host lanes having lane-positions 1 to $2^{N-1}$ to first lanes having lane-positions 1 to $2^{N-1}$ respectively, for a split configuration; and second split switch connection means, in the partial cross-bar switching means, for forming switch connections that connect host lanes having lane-positions $(2^{N-1}+1)$ to $2^N$ to second lanes having lane-positions 1 to $2^{N-1}$ respectively, for the split configuration.

* * * * *